No. 613,909. Patented Nov. 8, 1898.
A. PAGE.
BICYCLE BRAKE.
(Application filed Dec. 11, 1896. Renewed Mar. 30, 1898.)
(No Model.)
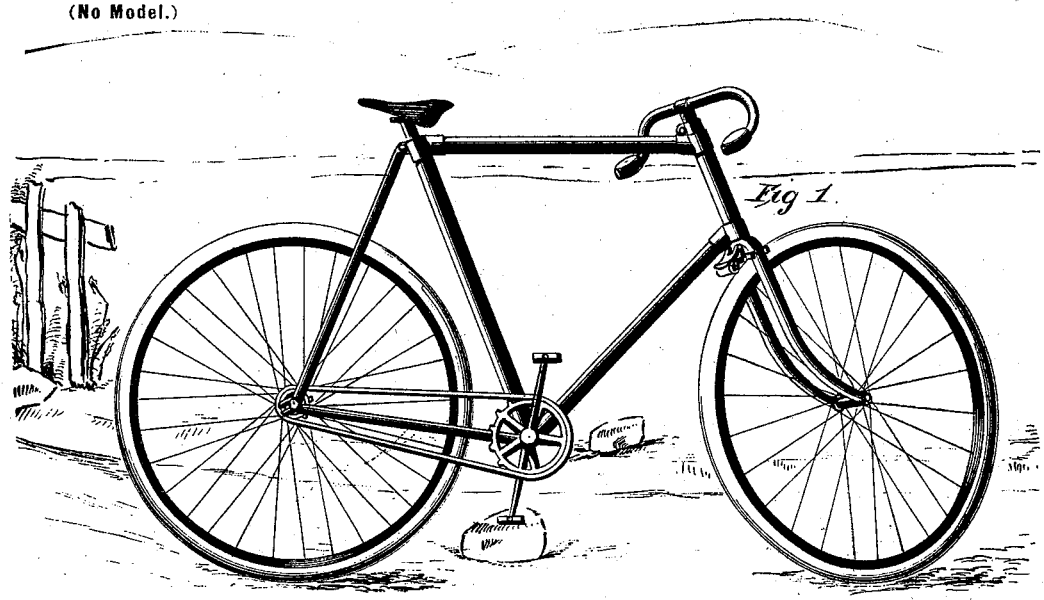
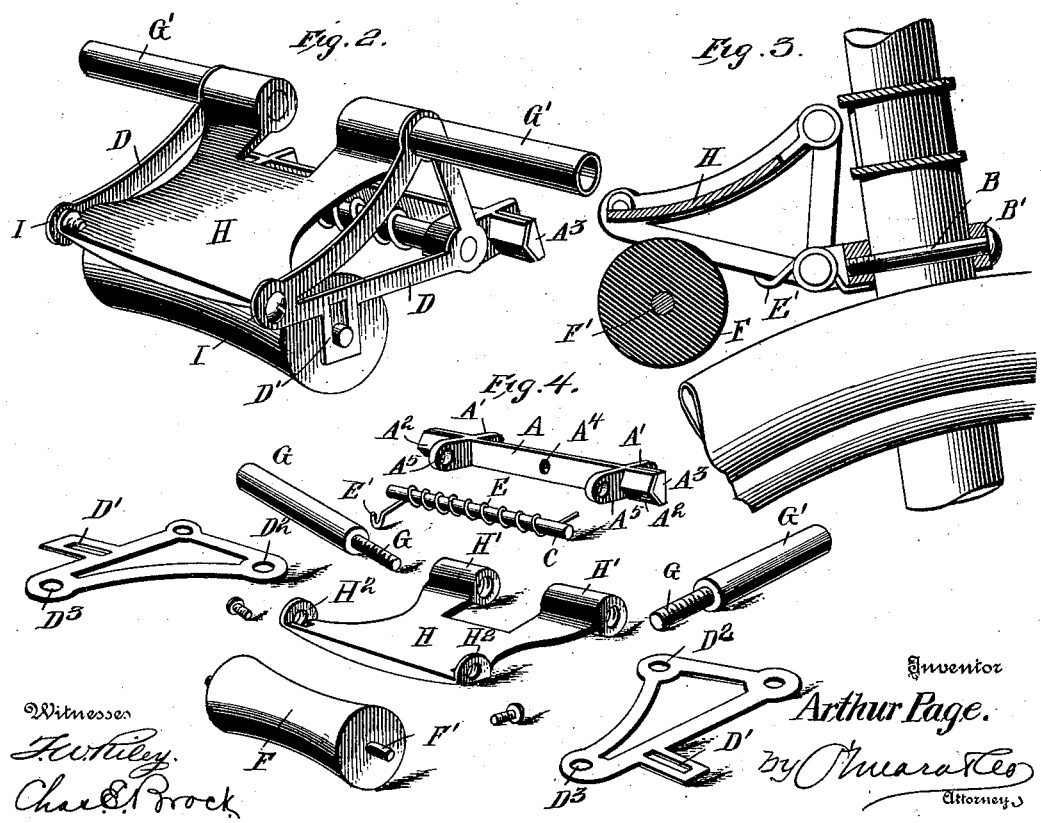
Witnesses
Inventor
Arthur Page.

UNITED STATES PATENT OFFICE.

ARTHUR PAGE, OF HORNELLSVILLE, NEW YORK, ASSIGNOR OF ONE-FOURTH TO FRANK McCORMACK, OF SAME PLACE.

BICYCLE-BRAKE.

SPECIFICATION forming part of Letters Patent No. 613,909, dated November 8, 1898.

Application filed December 11, 1896. Renewed March 30, 1898. Serial No. 675,801. (No model.)

*To all whom it may concern:*

Be it known that I, ARTHUR PAGE, residing at Hornellsville, in the county of Steuben and State of New York, have invented a new and useful Bicycle-Brake, of which the following is a specification.

My invention relates to bicycle-brakes, and has for its object to provide a bicycle-brake for use by contact with the tire of the front wheel, which may also be used as a coaster, or support upon which to rest the feet when off the pedals.

With this object in view my invention consists in the improved construction, arrangement, and combination of parts hereinafter fully described and afterward specifically pointed out in the appended claim.

In the drawings forming a part of this specification, Figure 1 is a view showing the practical application of my invention. Fig. 2 is a detail perspective view of the brake detached from the bicycle. Fig. 3 is a sectional view showing the brake attached to the bicycle. Fig. 4 is a view showing all of the parts separated.

In constructing a brake in accordance with my invention I employ a cross bar or plate A, which is adapted to be arranged upon the rear side of the fork and is provided with forwardly-projecting lugs A', which rest between the forks, and at each end the bar is made angular, as shown at $A^2$, in order to receive the cushion $A^3$, which rests against the fork member, thereby preventing scratching the said fork.

In order to clamp the bar A to the fork, I employ a bolt B, which passes through a clamp-plate B', arranged upon the front of the fork, and screws into a central opening $A^4$, produced in the bar A. The bar A is also provided with rearwardly-projecting bearing-ears $A^5$, in which is journaled a rod C, the ends of said rod projecting through the bearing-ears, and rigidly attached to the said projecting ends are the triangular-shaped side pieces D of the frame.

A coil-spring E surrounds the journal-rod C, one end of said spring resting beneath the bar A, while the opposite end is hooked, as shown at E', and is adapted to engage the under side of one of the triangular side pieces of the frame, as most clearly shown in Fig. 3. The function of this spring is to normally hold the frame in an elevated position.

The triangular-shaped side pieces D are formed with longitudinally-slotted depending portions D', and journaled in the longitudinal slot of said portions are the spindles F' of the brake-roller F, and it will be noted that the said depending portions are arranged adjacent to the rear ends of the side pieces D.

The upper corner of each frame is apertured, as shown at $D^2$, and passing through the said apertures are the screws G, which pass into the threaded bosses H' of the toe-plate H, said threaded bosses being arranged at the forward end of said plate, while the rear end is provided with upwardly-projecting ears $H^2$, which are intended to receive the screws I, passed through the rear end of the side pieces D. The screws G are preferably constructed with laterally-projecting tubular portions G', as most clearly shown in Figs. 2 and 4.

The screws G and I securely unite the side members D and toe-plate H, said toe-plate being preferably curved to correspond with the curve of the side members, as most clearly shown in Fig. 3. The roller is also preferably curved in order to contact better with the pneumatic tire.

All of the parts constructed and arranged as herein shown and described can be quickly and easily applied to the front fork of any of the machines now in use by means of the bolt B and clamp-plate B'.

The spring E will normally hold the vibrating frame and roller elevated above the pneumatic tire.

Whenever it is desired to apply the brake, the rider simply presses upon the toe-plate, which pressure immediately throws the rear end of the frame downwardly, brings the brake and roller into contact with the pneumatic tire, and inasmuch as the depending portions of the frame in which the roller is journaled are slotted longitudinally or vertically it is obvious that the roller will have a slight upward movement or the frame have a slight downward movement, whereby the roller and toe-plate are brought into contact with each other, and this upward movement will prevent any sudden binding and at the same time will permit the under side of the toe-plate to come into contact with the roller, and as the under side of this plate is convexed it will bear completely upon the roller and thereby apply sufficient friction thereto to retard the motion of the bicycle. As soon as the pressure is removed from the toe-plate the spring will lift the said frame and roller to its normal or elevated position.

Thus it will be seen that I provide an exceedingly cheap, simple, and efficient construction of bicycle-brake which can be applied to the tire of the pnematic wheel without injury to the said tire.

Laterally-extended tubular ends of the screws G are employed as coasters whenever desired, and it will be noted by reference to Fig. 3 that any amount of pressure applied to the coasters will not affect the position of the frame or brake-roller, inasmuch as they are attached at the upper corner of the frame and, in fact, at a point in advance of the journal of said frame.

Having thus described my invention, what I claim as new, and desire to secure by Letters Patent, is—

In a bicycle-brake, the combination with the vibrating frame attached to the front fork of a bicycle, the movable brake-roller and the coasters attached to the said vibrating frame at a point above the pivotal journal of said frame, substantially as shown and described.

ARTHUR PAGE.

Witnesses:
A. DEPUE,
M. E. DUNNING.